United States Patent
Sakushima et al.

(10) Patent No.: US 6,256,437 B1
(45) Date of Patent: Jul. 3, 2001

(54) OPTICAL DEVICE AND ITS PRODUCTION METHOD

(75) Inventors: Shiro Sakushima, Nara; Koji Takemura, Kyoto; Michiaki Hiraoka, Uji; Mikio Kyomasu, Suwa, all of (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 09/164,262

(22) Filed: Sep. 30, 1998

(30) Foreign Application Priority Data

Sep. 30, 1997 (JP) .................................................. 9-266311

(51) Int. Cl.$^7$ .................................................. G02B 6/30
(52) U.S. Cl. .............................................. 385/49; 385/147
(58) Field of Search .............................. 385/49, 88, 147, 385/129; 438/25, 27

(56) References Cited

U.S. PATENT DOCUMENTS

| | | | |
|---|---|---|---|
| 5,217,568 | * 6/1993 | Tessier et al. | 156/659.1 |
| 5,499,732 | 3/1996 | Nishimoto . | |
| 5,611,008 | 3/1997 | Yap . | |
| 5,644,668 | 7/1997 | Chambers et al. . | |
| 5,684,902 | * 11/1997 | Tada | 385/88 |
| 5,960,141 | * 9/1999 | Sasaki et al. | 385/88 |
| 6,108,480 | * 8/2000 | Mizuta et al. | 385/129 |
| 6,112,001 | * 8/2000 | Kishida et al. | 385/49 |

FOREIGN PATENT DOCUMENTS

| | | | |
|---|---|---|---|
| 0 636 911 | 2/1995 | (EP) . | |
| 406160656A | * 6/1994 | (JP) | G02B/6/12 |
| 02000089054A | * 3/2000 | (JP) | G02B/6/13 |

OTHER PUBLICATIONS

Okano H., et al.; "Passive Alligned Hybrid Integrated WDM Transceiver Module Using Planar Lightwave Circuit Platform";IEICE Transactions on Electronics, JP, Institute of Electronics Information and Comm. Eng. Tokyo; vol. E80–c, No. 1; p. 112–116.

* cited by examiner

Primary Examiner—Frank G. Font
Assistant Examiner—L. Lauchman
(74) Attorney, Agent, or Firm—Hogan & Hartson L.L.P.

(57) ABSTRACT

On one principal plane of a silicon substrate 1, a silicon oxide film 2 having an opening 2a is formed, and a silicon nitride film 3 having an opening 3b overlapping the opening 2a and a recessed marker 3b is stacked on the silicon oxide film 2. Next, the substrate 1 is etched through the openings 2a, 3a to provide an alignment groove 1a for an optical waveguide, and an electrode pattern 5 is formed. Light of which wavelength transmits through the substrate 1 and the silicon oxide film 2 is radiated from the other principal plane of the substrate 1, and the optical element is assembled with the marker 3b serving as the reference while the marker 3b and the optical element are monitored.

5 Claims, 7 Drawing Sheets

OPTICAL DEVICE AND ITS PRODUCTION METHOD

SPECIFICATION

An optical device and its production method.

1. Field of the Invention

The present invention relates to a substrate for optical device, wherein an optical waveguide such as optical fiber and an optical element such as light-emitting device or photo detector are aligned on a substrate to optically couple these optical parts with higher accuracy, an optical module using said substrate, and a method for producing said device and module. In the following, the substrate for optical device and the optical module are simply called optical devices.

2. Prior Art

In recent years, optical communication systems have been required to have a larger capacity and a greater variety of functions, and with these trends, optical devices such as optical transmitters and optical receivers have been required to be smaller in size, greater in integration, and lower in cost. In particular, to reduce the assembling costs of optical devices, special attention has been given to a technique for mounting optical parts such as an optical fiber and a semiconductor optical element on the same substrate, so-called optical hybrid assembly technique and silicon platform.

When the above-mentioned technique is used, an optical fiber and an optical element can be positioned on a substrate, without alignment, by just assembling the optical fiber in a V-groove formed on the substrate and assembling the optical element on a conductor pattern formed on the same substrate. To achieve this assembly of optical parts on the substrate without alignment, for example, both the V-groove for assembling the optical fiber that is formed in the substrate and the electrode for assembling the optical element that is formed on the substrate, or both the V-groove and an alignment marker for mounting the optical element must be formed with higher accuracy, and the positional relation between the two optical parts must be determined with an accuracy of submicron-order.

With reference to FIG. 6, a method of producing such a silicon platform will be described. FIG. 6(a) through (h) are plan views illustrating production steps of a conventional substrate for optical hybrid assembly.

First, as shown in FIG. 6(a), on a single crystal substrate 71 having a principal plane set in a certain direction, a film that is resistant to an etchant of silicon, such as silicon oxide film or silicon nitride film, is formed. Next, a photo mask for forming a V-groove is used to pattern the above-mentioned film by photo-lithography, then a pattern 72 for forming a V-groove having an area of exposed silicon substrate 71 is obtained.

Next, as shown in FIG. 6(b), the pattern 72 for forming a V-groove is used as a mask and the exposed area 71a of FIG. 6(a) is subjected to anisotropic etching with an etchant such as sodium hydroxide (NaOH) or potassium hydroxide (KOH) to form a V-groove 73.

Next, as shown in FIG. 6(c), the pattern 72 for forming a V-groove of FIG. 6(b) is removed, then a protective layer 74 such as a silicon oxide film or a silicon nitride film is formed entirely over one principal plane, including the V-groove 73, of the silicon substrate 71 by, for example, thermal oxidation, sputtering or plasma CVD.

Next, as shown in FIG. 6(d), a photo mask for forming electrodes and markers for assembling an optical element is used to form a photoresist 77 over a region excluding electrode formation regions 75 and regions for a marker 76 for an optical element.

Next, as shown in FIG. 6(c), a metal film 78 of an electrode material such as gold (Au) is formed entirely, by vapor deposition or the like, over one principal plane of the silicon substrate 71.

Next, as shown in FIG. 6(f), the photoresist 77 of the region except the electrode formation regions 75 and regions for marker for optical element 76 in FIG. 6(d) is removed by liftoff to form an electrode pattern 79 including the optical element mounting part and markers for markers for assembling optical element 80.

Next, as shown in FIG. 6(g), solder layers are formed on the optical element mounting parts 81 of the electrode pattern 79. After that, as shown in FIG. 6(h), a fiber stopper groove 82 is formed by slicing, and the silicon substrate 81 is cut off at an end facing 81a. As a result, a substrate J for an optical device, wherein a V-groove 83 for assembling an optical fiber not illustrated and optical element mounting parts 81 for assembling an optical element not illustrated are formed on the same silicon substrate 71m is completed.

According to the above method, alignment is effected with alignment markers that are formed near the edges of the silicon substrate when the V-groove for mounting an optical fiber is formed and with markers of the photo mask that is used when the electrodes and markers for assembling the optical element are formed.

However, it has been impossible for aligners of the contact type, etc. to make alignment of submicron-order in many cases, and even if such an alignment is possible, it has been hard to distinguish markers formed on a substrate because a distribution of film thickness is generated in the photoresist around a V-groove when the photoresist is applied to the silicon substrate in which the V-groove has been formed.

Even when such problems are cleared, as the alignment markers on the silicon substrate side have to undergo various production processes, the silicon substrate may warp due to heat history of these production processes. This warp may cause displacement of the alignment markers.

Accordingly, in the past, it has been very difficult to align the V-groove and the markers for mounting optical element, and in turn, it has been hard to assemble an optical fiber and an optical element with high accuracy without making an alignment operation. Hence it has been hard to provide excellent optical devices of good performance.

To solve this problem, the present inventors proposed a method for producing an electrode and/or an alignment marker concurrently with the formation of a V-groove (Japanese Provisional Patent Hei8-334303), however, its production process is more complicated in comparison with the above conventional method. Moreover, the stack structure itself of the electrode and/or the alignment marker formed by the more complicated production process is more complicated, and the fluctuation of edges of the marker is greater. This, in turn, deteriorates the accuracy of detection of the edges of the marker by image analysis. Hence, even if a platform is formed with high accuracy, it is hard to expect an improvement in the accuracy of assembly of an optical element. As a result, the positioning accuracy between the optical waveguide and the optical element such as a light-emitting device or a photo detector deteriorates, and it is hard to provide an optical device of excellent performance.

SUMMARY OF THE INVENTION

The present invention was made in view of the above-mentioned conditions. One object of the present invention is to provide an optical device wherein a groove for mounting an optical fiber or an optical waveguide and an alignment marker for an optical element are aligned with a high accuracy, said optical device having an alignment marker enabling accurate detection of a pattern, and a method of producing the optical device.

The optical device according to the present invention comprises a substrate, a resist film provided on one principal plane thereof, an opening for forming an optical waveguide provided in said resist film, a marker being a recess being formed concurrently with said opening and having a predetermined positional relationship with said opening and having a flat bottom, an alignment groove for optical waveguide being formed by etching said substrate through said opening, and an electrode pattern for fixing an optical element on said substrate.

Said resist film may be a single layer, and in that case, when the alignment groove is formed, the marker is masked to prevent it from being etched. Preferably, said resist film comprises a lower resist film and an upper resist film of which materials differ from each other, said opening comprises openings penetrating both said lower resist film and said upper resist film, and said marker is a recess that is formed by etching only said upper resist film and said lower resist film is exposed at the bottom of said recess. The lower resist film and the upper resist film differ from each other in etching characteristics, and materials for them have an etchant that etches only the upper resist film and does not etch the lower resist film. The electrode pattern is provided on the substrate or the lower resist layer, or on the upper resist layer.

Preferably, both said substrate and said lower resist film have a common wavelength of light transmission, and it does not matter whether said upper resist film transmits light of said wavelength or not. This wavelength is, for example, infrared wavelength, and when the substrate is silicon, it is 1.2 $\mu$m or over.

Preferably, said substrate is silicon, and one of said lower resist film and said upper resist film is silicon oxide and the other is silicon nitride. Silicon transmits light of which wavelength is 1.2 $\mu$m or over, and both silicon oxide and silicon nitride transmit light of which wavelength is 1.2 $\mu$m or over. Because of this, a recessed marker and an optical element to be mounted is recognized from the other principal plane of the silicon substrate. Thus the optical element is positioned accurately in relation to the recessed marker.

Preferably, the optical device further includes an optical waveguide mounted on said alignment groove and an optical element that is positioned in relation to said marker and fixed on said electrode pattern.

The method of producing an optical device according to the present invention comprises a step of forming a lower resist film having a first opening on one principal plane of a substrate, a step of stacking an upper resist film having a second opening overlapping the first opening and a recess having a certain positional relationship in relation to said second opening on said lower resist film, a step of forming an alignment groove for optical waveguide by etching said substrate through said second opening and first opening, and a step of forming an electrode pattern for fixing an optical element on said substrate, and in the method, said second opening and said second recess are formed concurrently by a common mask.

Preferably, the method of producing an optical device according to the present invention further includes a step of detecting the position of said optical element in relation to said recess by irradiating light having a wavelength transmittable in both said substrate and said lower resist film from the other principal plane side of said substrate and detecting reflected light from said recess and said optical element, and a subsequent step of fixing said optical element on said electrode pattern.

In the present invention, as both the recessed marker and the opening for forming the alignment groove for an optical waveguide are concurrently formed by the same mask, they maintain a given positional relationship, and in turn, the marker maintains a correct position in relation to said alignment groove. Furthermore, as the bottom of the marker is flat, edges of the marker can be recognized accurately, and as the recess of the marker is shallow in depth, the fluctuation of the edge position is small. Moreover, as the number of steps after formation of the marker is small, the substrate is free of thermal deformation or the like.

In the present invention, the optical element is positioned with reference to the marker, and this means the optical element is accurately positioned in relation to the alignment groove for the optical waveguide. As a result, the requirement of accuracy of the pattern for fixing the electrode is less strict.

The substrate has, for example, transparent wavelength in the infrared range, and if resist films or at least the lower resist film are made to be transparent at this wavelength, the marker and the optical element can be recognized from the other principal plane side of the substrate. Thus the optical element is mounted while the mounting position is monitored, and the accuracy of mounting the optical element is improved.

BRIEF DESCRIPTION OF THE DRAWINGS

FIG. 3 is a production process diagram of the substrate for optical device of the embodiment.

FIG. 4(a) is a sectional view along the line A—A of FIG. 3(a).

FIG. 4(b) is a sectional view along the line B—B of FIG. 3(b).

FIG. 4(c) is a sectional view along the line C—C of FIG. 3(c).

FIG. 4(d) is a sectional view along the line D—D of FIG. 3(d).

FIG. 5 is a sectional view showing the steps of production of the substrate for optical device of the embodiment.

FIG. 6 is a production process diagram of a substrate for optical device of the prior art.

BEST EMBODIMENT

With reference to attached drawings, an embodiment of the present invention will be described.

Figure 1:
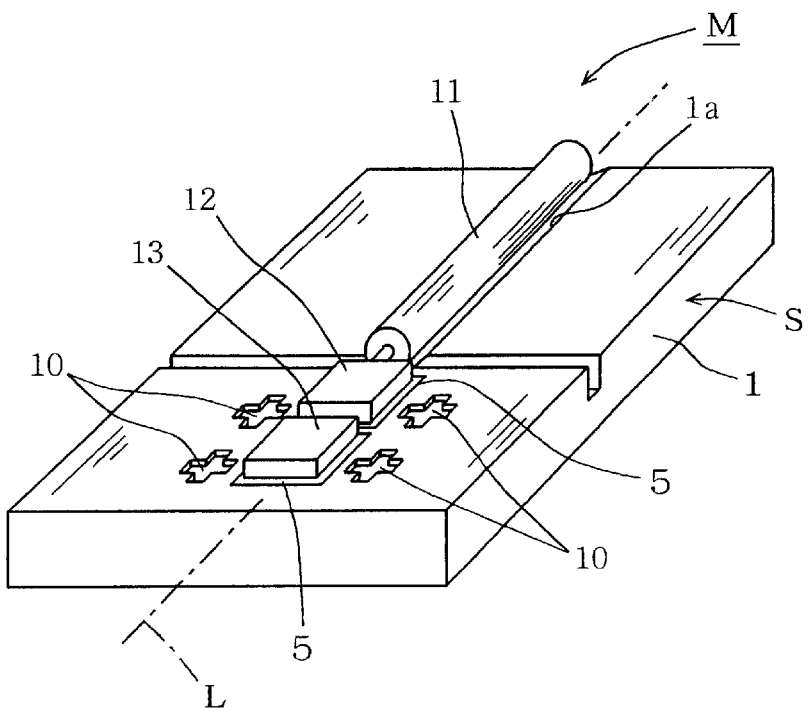
FIG. 1 is a perspective view of an optical module using a substrate for optical device of an embodiment.

FIG. 1 is a perspective view of an optical module M of the embodiment. As shown in FIG. 1, the optical module M mainly comprises a substrate for optical device S, an optical waveguide 11 such as an optical fiber, a light-emitting device 12 being an optical element to be optically coupled to the optical waveguide 11, and a photodetector 13 that monitors the output of the light-emitting device 12 and sends a control signal to the light-emitting device 12. In FIG. 1, illustration of an electrode pattern except for electrode patterns 5 is omitted. The light-emitting device 12 and the photo detector 13 are electrically connected to external circuits, respectively.

The substrate for optical device S is composed of a substrate 1 of single crystal silicon, etc. The substrate 1 is provided with a V-shaped alignment groove 1a having a depth adequate for mounting the optical waveguide 11 (about 100 μm), electrode patterns 5 for mounting electrical elements such as the light-emitting device 12 and the photo detector 13, and recessed markers 10 (depth: 0.1~2 μm; width: 10 μm approx.; area: 500 μm² approx.) being recesses provided in only the upper resist film of, for example, two resist films. As the bottom of each recess is the lower resist film, the bottom is flat and insulating. The recessed markers 10 are formed in two specified positions for, for example, each of the elements 12, 13 in relation to a central axis L of the alignment groove 1a corresponding to the optical axis of the optical waveguide 11.

Figure 2:
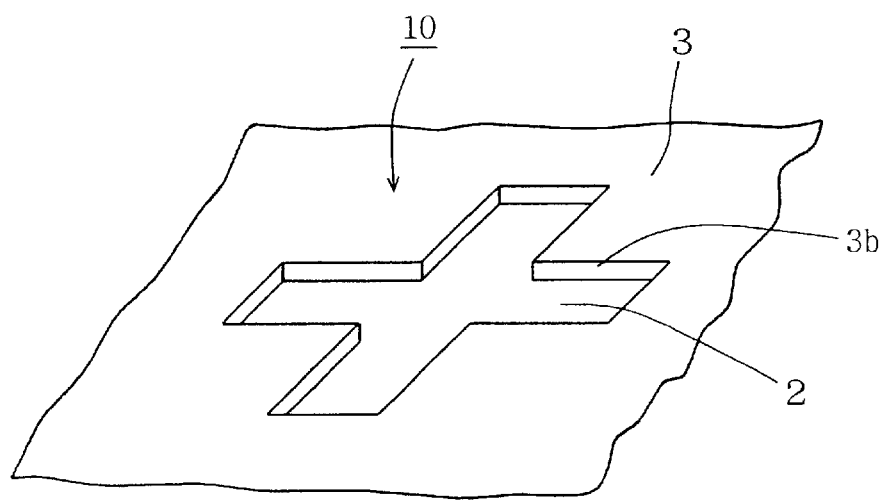
FIG. 2 is a perspective view of an alignment marker.

FIG. 2 is an enlarged view of a recessed marker 10. In FIG. 2, a recessed marker 10 is illustrated as a crosswise opening. The shape of the opening is not limited to this. Any shape will do, provided that edges can be easily detected when an optical element is assembled. For example, the shape of the opening may be a rectangle, various polygons, a circle, etc. The conventional markers, which are formed concurrently with electrode patterns, have greater fluctuations of the edges thereof, because the film thickness is greater and the production process is more complicated. Hence, for the conventional markers, it is hard to detect edges with high accuracy. In contrast to it, according to the present invention, as the recessed markers are formed by utilizing openings in an insulating film, the gap is made smaller, and edges is detected with high accuracy. Moreover, edges is detected at a high accuracy suitable to image analysis by selecting a combination of insulating films that constitute the recess markers.

Figure 4:
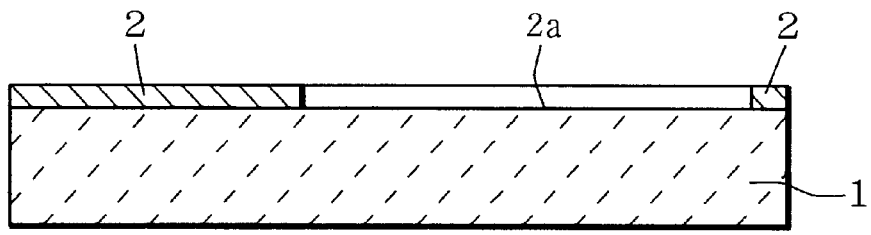
FIG. 4 is a sectional view showing the steps of production of the substrate for optical device of the embodiment.
Figure 4:
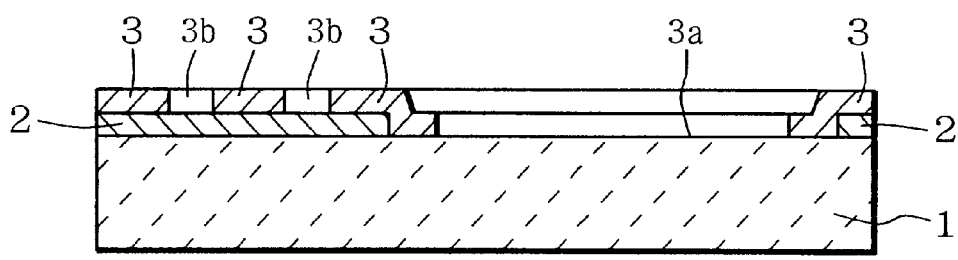
Figure 4:
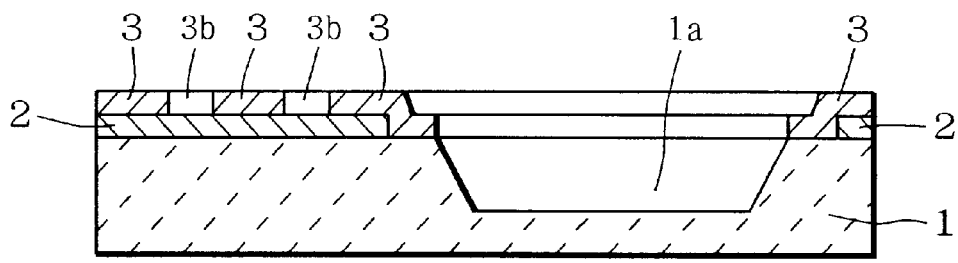
Figure 4:
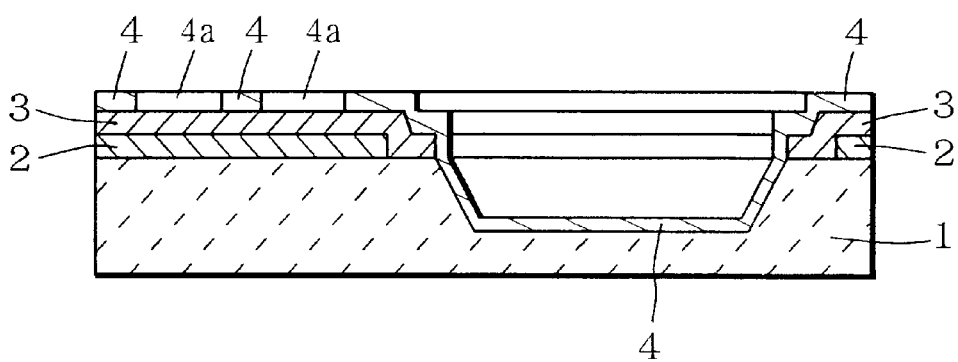
Figure 5A:
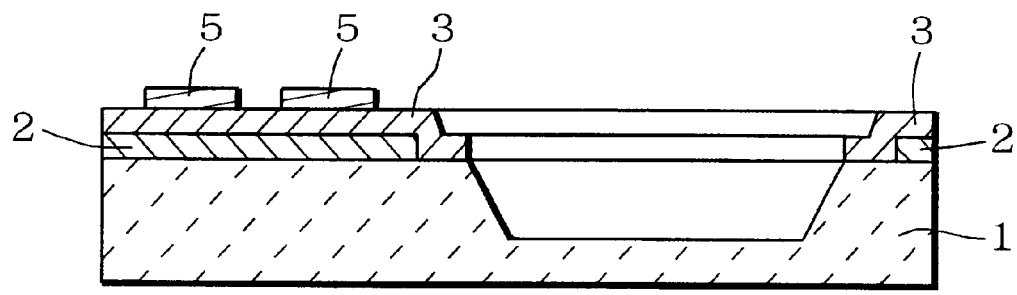
FIG. 5(a) is a sectional view along the line E—E of FIG. 3(e).
Figure 5B:
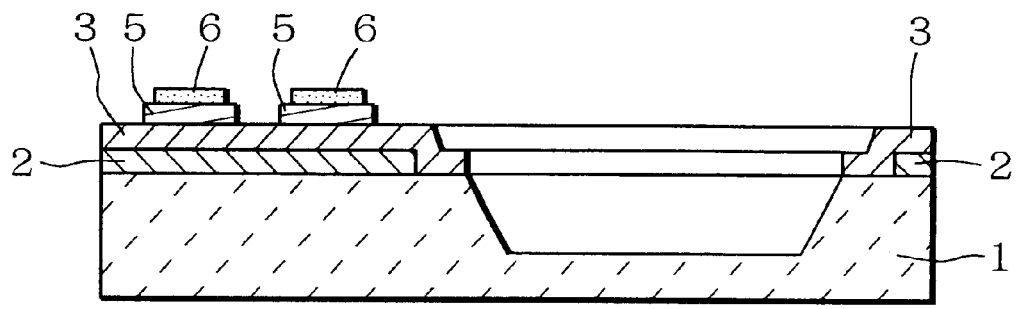
FIG. 5(b) is a sectional view along the line F—F of FIG. 3(f).
Figure 5C:
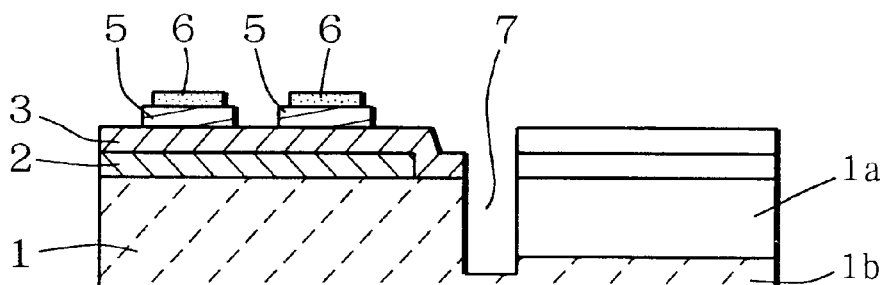
FIG. 5(c) is a sectional view along the line G—G of FIG. 3(g).
Figure 6A:
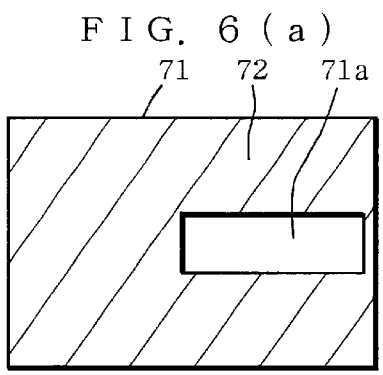
FIG. 6(a) shows a state after the formation of a mask for V-groove formation.
Figure 6B:
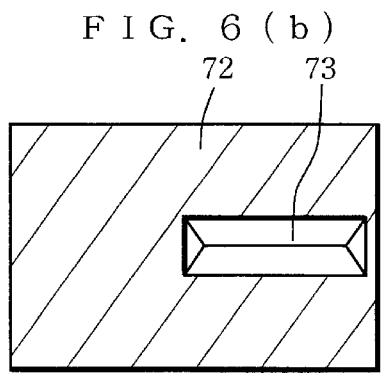
FIG. 6(b) shows a state after the formation of a V-groove.
Figure 6C:
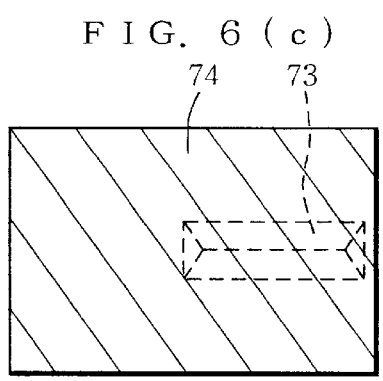
FIG. 6(c) shows a state after formation of a protective layer subsequent to the formation of the V-groove.
Figure 6D:
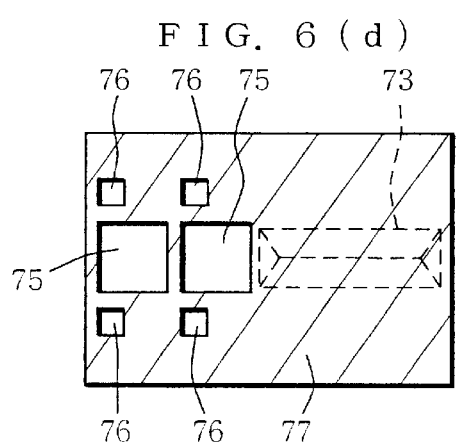
FIG. 6(d) shows a state after application of a resist for marker formation.
Figure 6E:
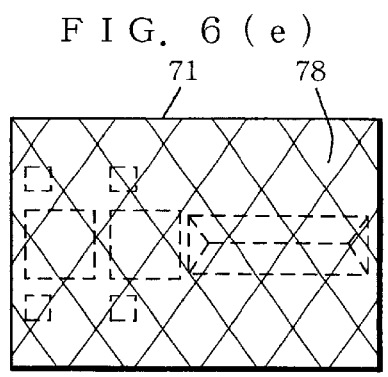
FIG. 6(e) shows a state after formation of a metal film.
Figure 6F:
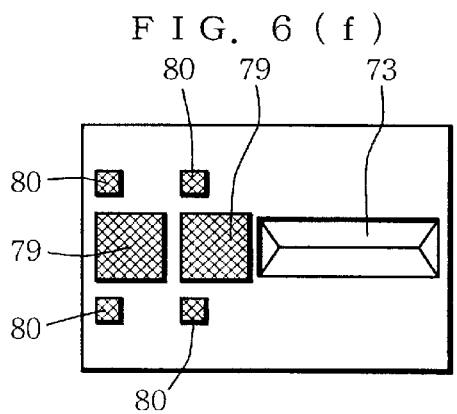
FIG. 6(f) shows a state after formation of electrodes and markers.
Figure 6G:
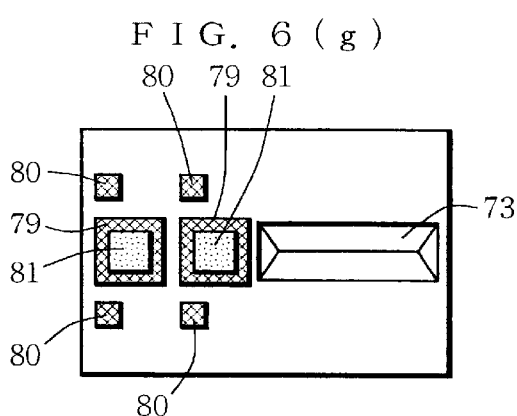
FIG. 6(g) shows a state after formation of a solder layer.
Figure 6H:
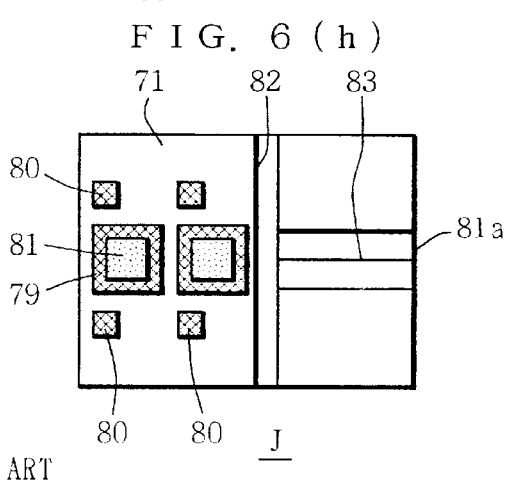
FIG. 6(h) shows the completed substrate for optical device.

Next, with reference to FIG. 3, FIG. 4 and FIG. 5, a production method of the substrate for optical device S will be described. FIG. 3(a) through (g) are plan views showing steps of production of the substrate for optical device. FIG. 4(a) through (d) and FIG. 5(a) through (c) are sectional views of FIG. 3(a) through (g), respectively. FIG. 4(a) is a sectional view along the line A—A of FIG. 3(a). FIG. 4(b) is a sectional view along the line B—B of FIG. 3(b). FIG. 4(c) is a sectional view along the line C—C of FIG. 3(c). FIG. 4(d) is a sectional view along the line D—D of FIG. 3(d). FIG. 5(a) is a sectional view along the line E—E of FIG. 3(e). FIG. 5(b) is a sectional view along the line F—F of FIG. 3 (f). FIG. 5(c) is a sectional view along the line G—G of FIG. 3(g).

Figure 3A:
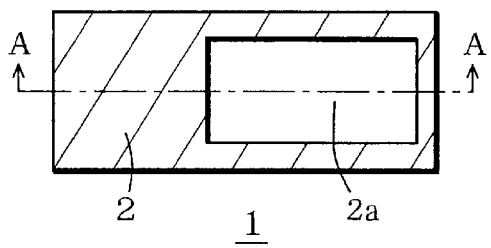
FIG. 3(a) shows a silica mask.

As shown in FIG. 3(a) and FIG. 4(a), first, a substrate 1 comprising a single crystal silicon, of which principal plane is a plane (100), is provided. A resisting first resist film 2 having an opening 2a (for example, a silicon oxide (SiO2) film) is formed, to a thickness of from 0.5 to 1 μm, entirely over one principal plane of the substrate 1, by, for example, thermal oxidation, sputtering or plasma CVD, or a combination of such thin film formation methods.

In other words, to form a V-groove being the alignment groove 1a for assembling the optical waveguide 11 shown in FIG. 1, the first resist film 2 having an opening 2a that is wider than the region to be formed practically is formed by photo-lithography using the first photo mask P1 (not illustrated). Here, the substrate 1 may be provided with a mask alignment marker of a given shape (not illustrated), and photolithography may be executed by registering the first photo mask P1 with this mark.

Figure 3E:
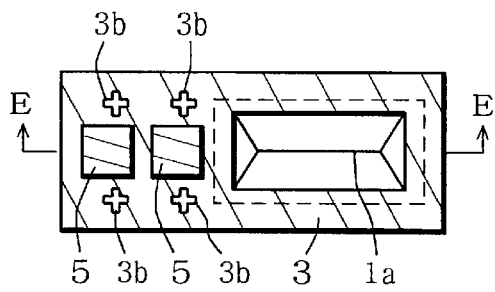
FIG. 3(e) shows a state after formation of the electrode.
Figure 3B:
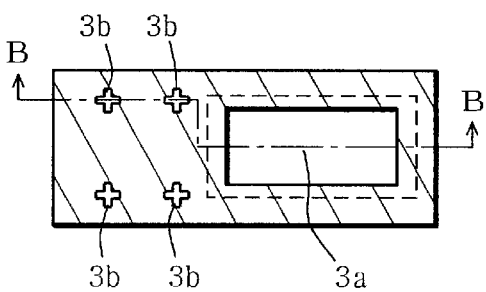
FIG. 3(b) shows a silicon nitride mask.

Next, as shown in FIG. 3(b) and FIG. 4(b), the second resist film 3 (for example, a silicon nitride film (SiNx such as Si3N4)) is formed by plasma CVD, etc. to a thickness of from 0.1 to 2 μm. In other words, the second resist film 3 having openings for a V-groove formation part 3a and marker formation parts 3b to be used in positioning of the optical element is stacked on the first resist film 2 with the second photo mask (reference mask) P2 (not illustrated) in which the pattern for forming the alignment groove for assembling said optical waveguide 11 and the alignment marker pattern for assembling the optical element are formed in specified positional relationships. Patterning of the formation parts 3a, 3b may be done by etching or liftoff. The formation part 3a overlaps with the formation part 2, and the accuracy of assembling the optical waveguide is determined by the formation part 3a.

Figure 3F:
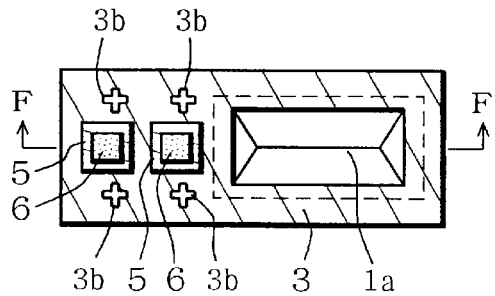
FIG. 3(f) shows a state after formation of a solder pattern.
Figure 3C:
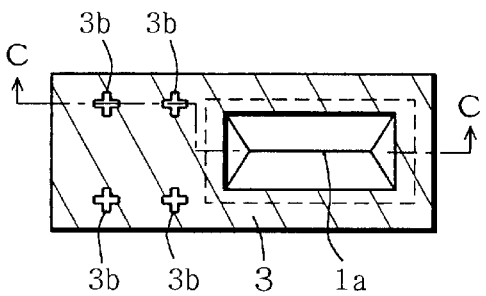
FIG. 3(c) shows a state after formation of a V-groove.

Next, as shown in FIG. 3(c) and FIG. 4(c), an aqueous solution of KOH, 30~45 weight percent, solution temperature of 60~80° C., is used to form a V-groove-shaped alignment groove 1a. The etching rate varies from crystal plane to crystal plane of the substrate 1, and this is used to form sides (slopes at an angle of about 55° against the surface of the substrate 1) of the groove from planes (111) of which etching rate is smaller. As the marker formation parts 3b are not etched because the first resist film 2 is present in the substrate.

Figure 3G:
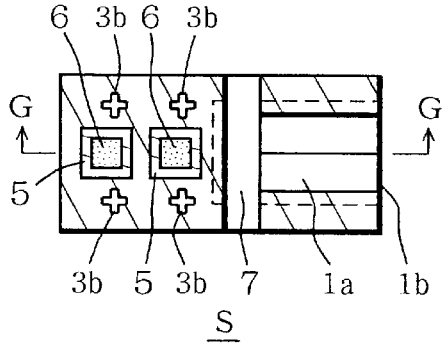
FIG. 3(g) shows a substrate for optical device completed after dicing.
Figure 3D:
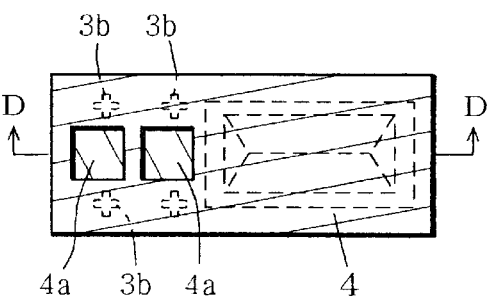
FIG. 3(d) shows a state after formation of a resist pattern for electrode formation.

Next, as shown in FIG. 3(d) and FIG. 4(d), the entire surface of the substrate 1, including the stepped portion of the alignment groove 1a, is coated with the photoresist. Next, a photoresist pattern 4 is formed by a pattern having openings in regions 4a in which electrode patterns are formed in a subsequent step. The pattern is registered to the regions formed with the above-mentioned second photo mask P2, namely, to the marker formation parts 3b formed with the second photo mask P2. In addition to the markers for assembling the optical element, the resist film 3 is provided with alignment markers for mask alignment, which are not illustrated, for the pattern 4.

As shown in FIG. 3(e) and FIG. 5(a), electrode materials such as Au/Pt/Ti, Au/Pt/TiN/Ti, Au/Ti, Au/Ni/Cr or Au/Cr are formed into a film of 0.3 μm to 1 μm in thickness by a thin film formation method such as electron beam source evaporation or sputtering. Then photo-resist patterns 4 are removed by liftoff to form electrode patterns 5. The above electrode materials are indicated in the order of upper layer/lower layer.

Next, as shown in FIG. 3(f) and FIG. 5(b), thin layers of solder 6 are applied over the electrode patterns, and as shown in FIG. 3(g) and FIG. 5(c), the edge of the substrate 1 is cut off and a groove is cut between the electrode pattern 5 and the alignment groove 1a by dicing to form the end face 1b and the groove 7 for fixing the end of the optical waveguide (it is called a fiber stopper when the optical waveguide 11 is an optical fiber). Thus the substrate for optical device S is produced.

When, for example, an optical fiber is assembled in the alignment groove 1a formed in a substrate for optical device S and an optical element such as a semiconductor laser device is assembled on the solder 6 on the electrode pattern 5 while recessed markers 10 are used as guides (reference points), the optical fiber and the optical element are optically coupled with each other with a very high accuracy. The edges of the markers 10 are distinct, because the bottoms of markers 10 are made of silicon oxide and are smooth and the thickness of the markers 10 is the thickness of the silicon nitride film and is thin. Moreover, as the markers 10 and the V-groove 1a are made by the same mask, the positional accuracy in relation with the V-groove 1a is high. With these arrangements, an optical module, that is passively aligned with high accuracy, is completed. In this case, as for the accuracy of the markers in relation to the V-groove, the errors are almost nil, for example, about 0 to 0.5 μm, in comparison with the conventional errors (±0.2~±1.5 μm).

Photoresists is applied evenly by, for example, spin coating before the formation of the alignment groove or by, for example, spray coating after the formation of the alignment groove. The alignment groove for an optical waveguide is not limited to a V-groove as is the case mentioned above. The configuration of the markers for assembling an optical element is not limited to the above-mentioned example. In place of an optical fiber, an optical waveguide being a waveguide formed in a surface layer of a substrate may be used. The optical element may be only a light-emitting device or only a photo detector. The substrate for optical device S may be made of, in addition to single crystal silicon, single crystal GaSa, quartz, synthetic resins, ceramics, etc. However, single crystal silicon is preferable from a viewpoint that the V-groove is formed by anisotropic etching with high positioning accuracy.

In the above-mentioned case, the formation of the V-groove is executed before the formation of the electrodes. However, electrode patterns may be formed first, then the V-groove may be formed. This method also has advantages similar to those mentioned above. This production process has a merit that liftoff is done easily and quickly.

Next, with reference to FIG. 7 through FIG. 10, a method of aligning the optical element 12 on the substrate for optical device S will be described.

Figure 7:
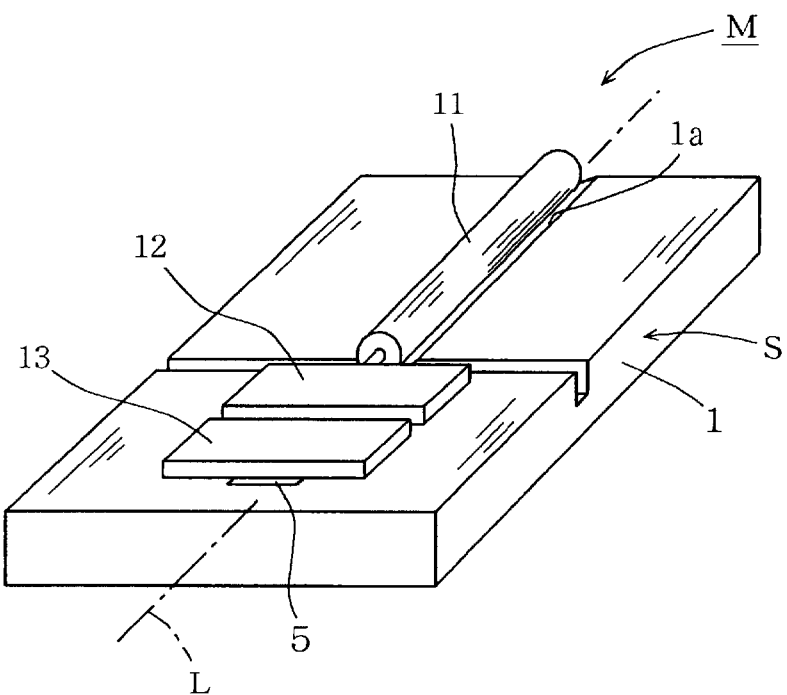
FIG. 7 is a perspective view of an optical module using a substrate for optical device of a modification.
Figure 8:
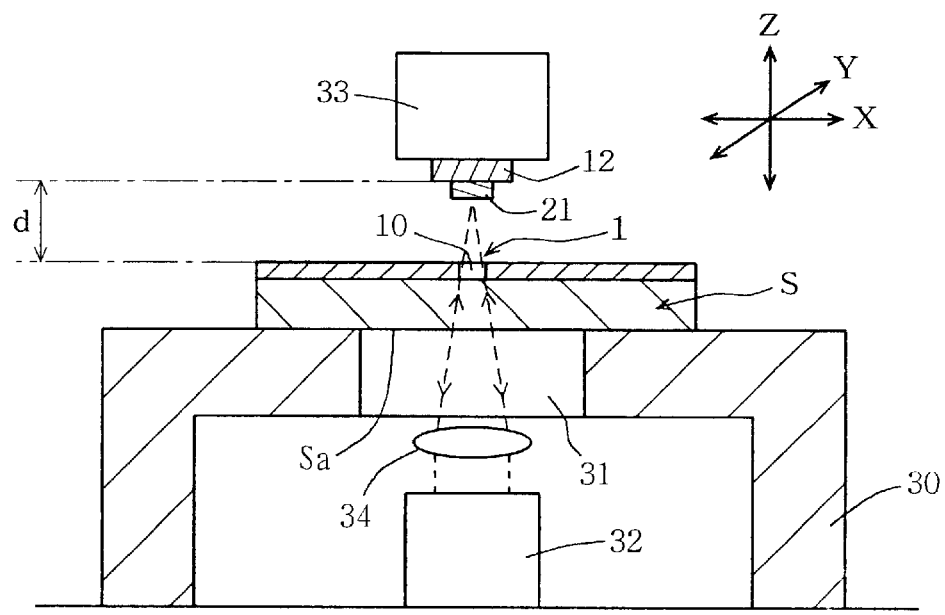
FIG. 8 is a sectional view showing alignment of the substrate and the optical element in the embodiment.
Figure 9:
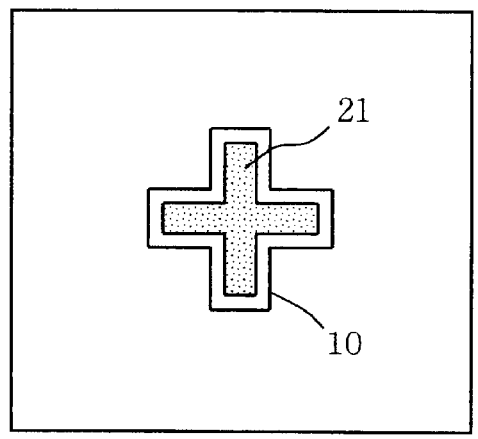
FIG. 9 is a diagram showing images for recognition of an alignment marker of a substrate and an alignment marker of an optical element.
Figure 10:
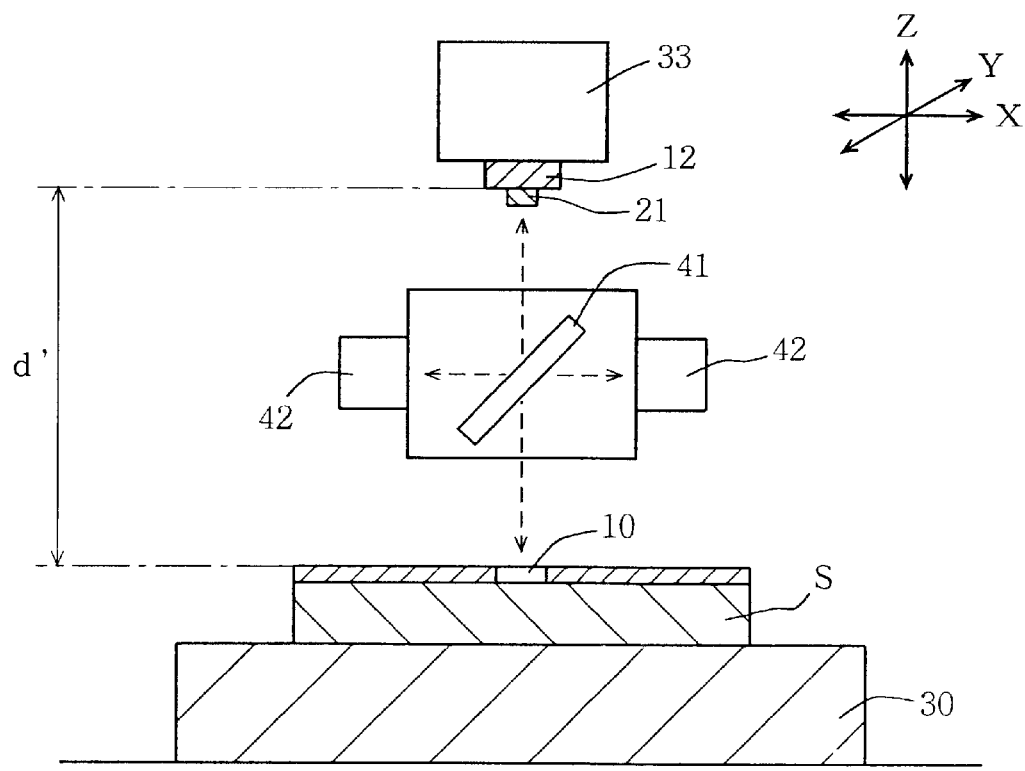
FIG. 10 is a diagram showing a method of roughly adjusting a substrate and an optical element.

A module M to be used is shown in FIG. 7. Parts identical or similar to those of FIG. 1 are denoted by the same marks as FIG. 1 for convenience. Differences from FIG. 1 are that the substrate S for the elements 12, 13 is stretched sidewise and a pair of markers 10 provided for each of the elements 12, 13 are concealed by the bottoms of the elements 12, 13. As shown in FIG. 8 through FIG. 10, each of the elements 12, 13 is provided with a pair of markers 21 so that these markers 21 overlap with the markers 10.

As shown in FIG. 8, to mount and heat the substrate S, a jig 30 having a through-hole 31 at the center thereof is used. An image analyzer 32 having a lens 34 is arranged beneath the through-hole 31 of the jig 30. The image analyzer 32 is provided with a pair of infrared lasers corresponding to one pair of markers 10 or an infrared light source such as a halogen lamp. The image analyzer 32 is provided with a half mirror for transmitting light from the light source towards the markers 10, separating reflected light from the markers 10 from the light of the light source and sending the reflected light to a photo detector. The image analyzer 32 uses the reflected light from the markers 10 and the reflected light from markers 21 provided on the elements 12, 13 to execute alignment. A stage 33 is arranged above the substrate S to hold the light-emitting device 12. In the following the assembly of the light-emitting device 12 will be described, and the photo detector 13 may be assembled in a similar manner.

The substrate S in which recessed markers 10 have been formed is mounted on the jig 30 so that the recessed markers 10 come above the through-hole 31. A light-emitting device 12 having a pair of alignment markers 21 is held on the stage 33. The stage 33 may move in the horizontal plane (X-Y) and in the vertical direction (Z) and turn around the Z axis. The substrate S and the light-emitting device 12 are arranged so that the distance between them d is, for example, from 1 to 5 μm.

The silicon substrate 1 transmits light of which wavelength is 1.2 μm or over. The silicon oxide film 2 and the silicon nitride film 3 are transparent to light of near infrared region of which wavelength is from 1 to 3 μm. The image analyzer emits laser light of which wavelength is, for example, 1.52 μm. The silicon substrate 1 is transparent to this light and can not be seen by this light. Reflection is low at the interface of the silicon substrate 1 and the silicon oxide film 2 and at the interface of the silicon oxide film 2 and the silicon nitride film 3 because differences in refractive indexes are small. As differences in refractive indexes are large between the silicon oxide film 2 and air and between the silicon nitride film 3 and air, some light is reflected at the surface of the markers 10 and at the surface of the silicon nitride film 3 to reach the image analyzer 32. The refractive index at the interface of silicon oxide and air differs from that at the interface of silicon nitride and air, and there is light scattered by the edges of the markers 10. Hence markers 10 is recognized by the image analyzer 32 through the silicon substrate 1 and the silicon oxide film 2.

Light that has transmitted through the markers 10 or the silicon nitride film 3 is partly reflected by the markers 21 to reach the image analyzer 32. The pattern of reflected light from the marker 10 and the pattern of reflected light from the marker 21 of the light-emitting device 12, that are observed by the image analyzer 32, are schematically shown in FIG. 9. The stage 33 is made to move in the X-Y plane and rotate so that the recognized images of the marker 10 and the marker 21 have a specified positional relationship, and the markers 21, 21 are positioned in relation to the markers 10, 10. In this way, markers 10, 21 can be recognized through the substrate S, and the light-emitting device 12 is accurately positioned in relation to the substrate S. While the conditions are kept just as they are, the stage 33 is made to move downward to mount the light-emitting device 12 on the substrate S. The light-emitting device 12 is heated by the jig 30 and jointed with the solder 6, etc. After jointing, the light-emitting device 12 is pressed and fixed by the stage 33 till the solder is cooled and the light-emitting device 12 is fixed. In this way, the light-emitting device 12 is assembled.

Preferably, the solder 6 is a thin layer of solder. It prevents positional fluctuation of the light-emitting device 12 due to flow of the solder 6. Preferably, after mounting the light-emitting device 12, the solder 6 is cooled by stopping heating the jig 30. Then the light-emitting device 12 is pressed by the stage 33 till the solder is cooled and the light-emitting device 12 is fixed. It prevents the displacement due to flow of the solder 6.

According to this method, the markers 10, 21 is detected by the image analyzer 32 from the back side of the substrate S, the positioning accuracy is very high, and the distance d between the substrate S and the light-emitting device 12 is set as minimal as about 1 to 5 $\mu$m in advance, and this minimizes the displacement when the positioning is made in the X-Y directions and after that the light-emitting device is lowered.

When elements 12, 13 are to be assembled, it is preferable that, according to the method shown in FIG. 10, rough adjustment of positioning of the light-emitting device 12, etc. is made first, and after that, fine adjustment is made according to the above method. As shown in FIG. 10, a substrate S is mounted on the jig 30. At first, the light-emitting device 12 is movably held by the stage 33 at a distance d' of about 10 cm from the substrate S. Then, between them, a position adjusting system comprising a mirror 41 tilted at 45° and image devices 42 such as two CCD cameras coaxially arranged on both sides of the mirror 41 is placed. Under this condition, a light source such as a laser in the jig 30 is used to detect the position of a recessed marker 10 on the substrate S, via the mirror 41, with one image device 42 and to detect the position of the alignment marker 21 formed on the light-emitting device 12, via the mirror 41, with the other image device 42. The stage 33 is shifted in the X-Y directions to overlap both images with each other so that both markers 10, 21 coincide. When two markers 10, 21 coincide, the position adjustment system comprising a mirror 41 and image devices 42 is moved out, and the stage 33 is lowered. In this way, the rough adjustment of the alignment of the light-emitting device 12 in a specified position on the substrate S can be executed. After that, as shown in FIG. 8, the light-emitting device 12 is positioned in relation to the markers 10, 10.

To detect markers 10, 21 satisfactorily with the above-mentioned image analyzer 32, it is preferable that the back face Sa of the substrate S is made specular. Here, a specular surface means the surface roughness (Ra) is 0.5 $\mu$m or under. It is desirable that the back face Sa is polished with abrasive grains of No. 4000 or under, and preferably, No. 12000 or under.

The present invention is not limited to the above-mentioned embodiment. It may be modified freely provided it does not deviate from the gist of the present invention. For example, when the optical device of FIG. 1 is to be produced, the optical elements 12, 13 are provided with markers 21, and in the steps of FIG. 8 through FIG. 10, the optical elements 12, 13 are assembled while markers 21 and markers 10 are recognized. In this case, as markers 10 and markers 21 are separated from each other, these markers 10, 21 are recognized separately, and the elements 12, 13 are assembled so that the positional relations of the markers 10, 21 meet specified requirements.

What is claimed is:

1. An optical device comprising:

a substrate;

a first resist film formed on one principal plane thereof;

a second resist film disposed on a surface of the first resist film;

an opening penetrating both said first resist film and said second resist film, which opening is wider in said first resist film than in said second resist film and has a bottom on the one principle plane of the substrate;

a marker being a recess in said second resist film, formed concurrently with said opening in the second resist film, having a predetermined positional relationship with said opening and having a flat bottom on the first resist film;

an alignment groove for accommodating an optical waveguide disposed in said substrate and coincident with said opening in the first resist film; and an electrode pattern for mounting an optical element on said substrate.

2. An optical device of claim 1 characterized in that said resist film comprises a lower resist film and an upper resist film, said lower resist film being made of a material different from that of said upper resist film, that said opening comprises a opening penetrating both said lower resist film and said upper resist film, that said marker is a recess formed by etching only said upper resist film, and that said lower resist film is exposed at the bottom of said recess.

3. The optical device of claim 1 characterized in that both said substrate and said first resist film have a common wavelength of light transmission.

4. The optical device of claim 3 characterized in that said substrate is silicon, and that one of said first resist film and said second resist film is silicon oxide and the other is silicon nitride.

5. An optical device of claim 1 characterized in that the optical device further comprises an optical waveguide mounted on said alignment groove and an optical element positioned in relation to said marker and fixed on said electrode pattern.

* * * * *